C. PEDUTO AND V. MARINO
COMBINATION POT.
APPLICATION FILED DEC. 31, 1921.
1,419,515.
Patented June 13, 1922.
2 SHEETS—SHEET 1.
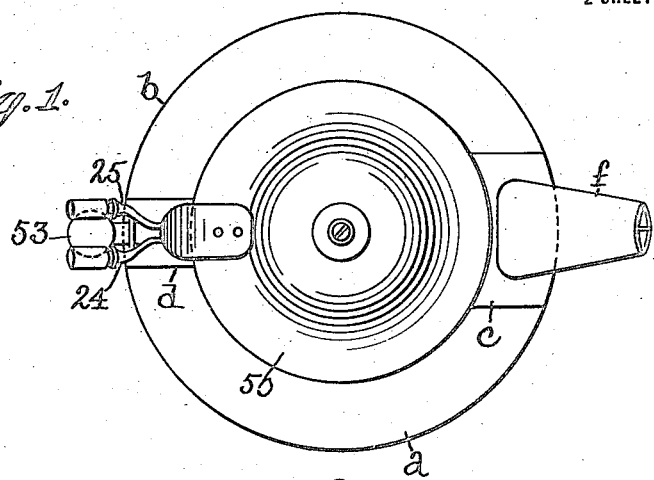
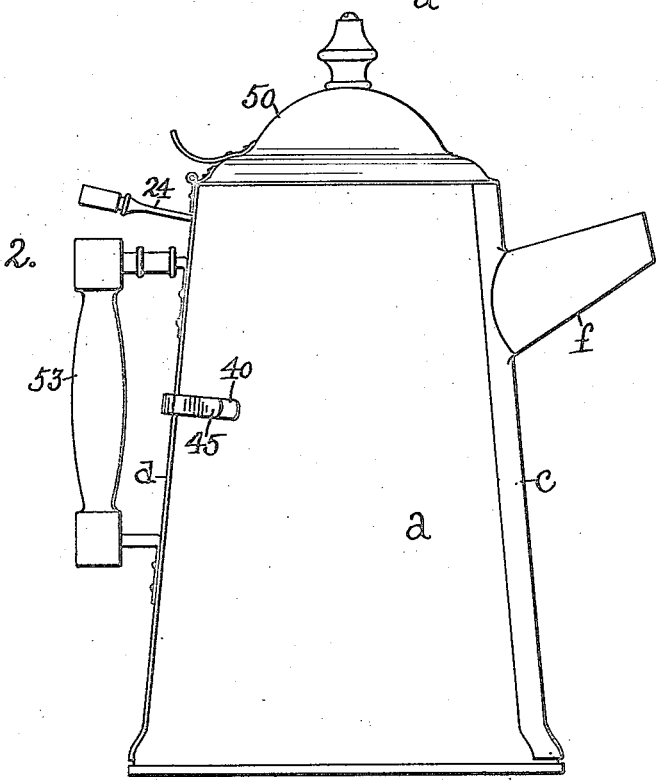

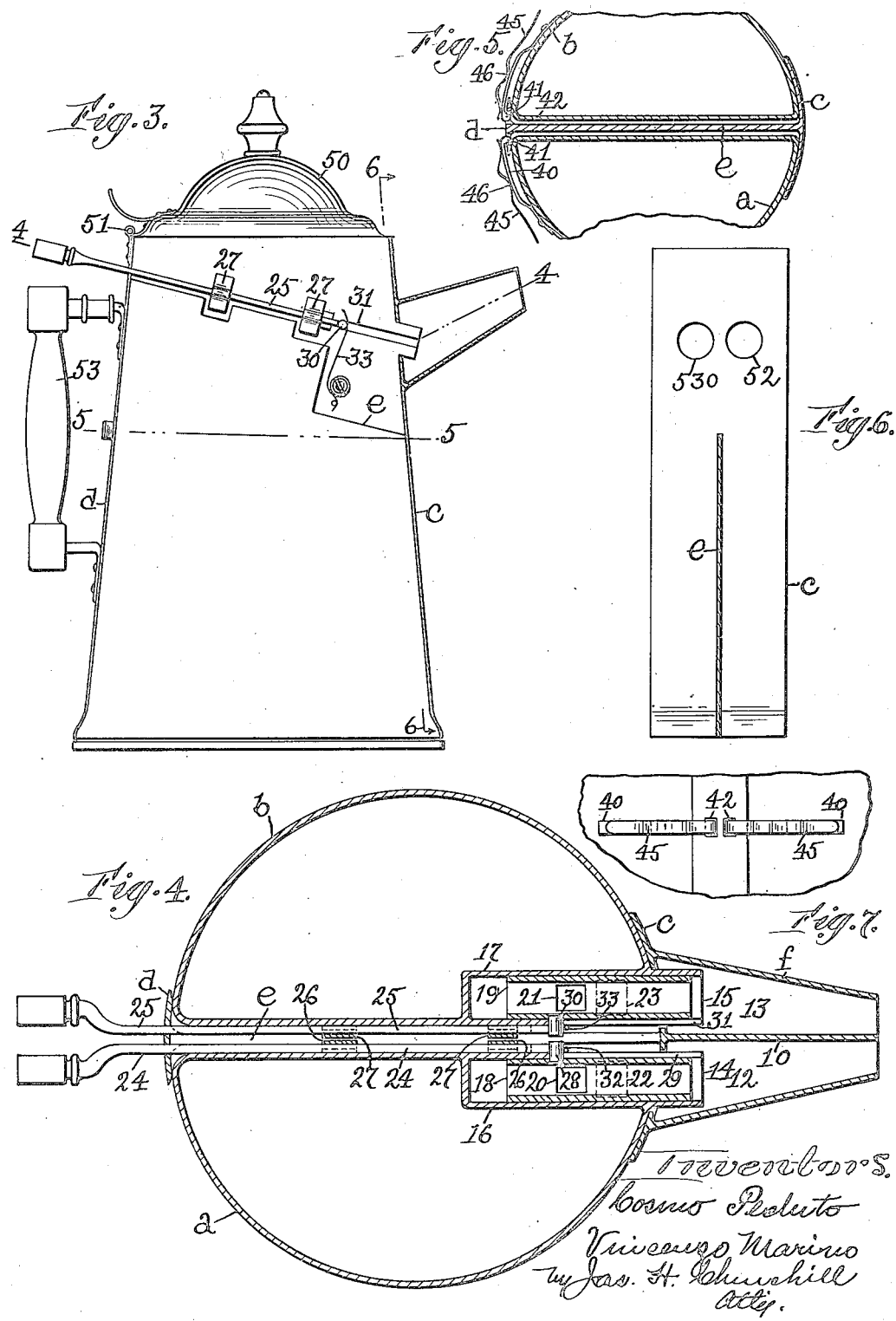

UNITED STATES PATENT OFFICE.

COSMO PEDUTO AND VINCENZO MARINO, OF MALDEN, MASSACHUSETTS.

COMBINATION POT.

1,419,515. Specification of Letters Patent. Patented June 13, 1922.

Application filed December 31, 1921. Serial No. 526,220.

*To all whom it may concern:*

Be it known that we, COSMO PEDUTO, a citizen of the United States, residing in Malden, in the county of Middlesex and State of Massachusetts, and VINCENZO MARINO, a subject of the King of Italy, residing in Malden, in the county of Middlesex and State of Massachusetts, have invented an Improvement in Combination Pots, of which the following description, in connection with the accompanying drawings, is a specification, like characters on the drawings representing like parts.

This invention relates to a combination pot and is herein shown as embodied in a combination coffee and tea pot.

The invention has for its object to provide a combination pot in which a plurality of receptacles are detachably secured to a common support or frame and have valved controlled outlets which communicate with a nozzle affixed to said frame. The supporting frame is provided with a handle, and provision is made whereby the valves controlling the flow of liquid from the pots or receptacles may be manipulated by the hand of the operator, which grasps the handle when it is desired to pour the liquid contained in either receptacle.

These and other features of this invention will be pointed out in the claims at the end of this specification.

Fig. 1 is a plan and

Fig. 2, an elevation of a combination pot embodying this specification.

Fig. 3 is an elevation of the combination pot shown in Fig. 1 with one of the receptacles removed.

Fig. 4, a cross section on the line 4—4, Fig. 3.

Fig. 5, a cross section on the line 5—5, Fig. 3.

Fig. 6, a vertical section on the line 6—6, Fig. 3, and

Fig. 7, a detail to show the locking devices for the receptacles.

Referring to the drawing, $a$, $b$ represent two receptacles, which are designed to hold two different liquids, such as coffee and tea, coffee and milk, tea and hot water, etc.

The receptacles $a$ $b$ may be of any suitable shape in cross section and are designed to be detachably secured to a common support or frame, which may be made as herein shown and consists of vertically extended front and rear members $c$, $d$, separated from each other and joined by a vertical wall $e$. The front member $c$ has affixed to it a nozzle $f$, which is divided by a partition 10 into two passages 12, 13, with which communicate outlet nozzles 14, 15 for the receptacles $a$, $b$.

The nozzles 14, 15 project beyond the receptacles $a$, $b$, and as shown form part of valve casings 16, 17, preferably cylindrical in cross section and containing cylindrical valves 18, 19 which are open at their front ends and are provided between their ends with ports 20, 21, which cooperate with ports 22, 23 in the valve casings 16, 17. The valves 18, 19 are designed to be moved forward to cause the ports 20, 21 to register with the ports 22, 23, by means of valve rods 24, 25 attached to the receptacles $a$, $b$, above the top of the intermediate wall $e$ of the supporting frame. The valve rod 24 slides in guides 26 attached to the receptacle $a$ and the valve rod 25 slides in guides 27 attached to the receptacle $b$.

The valve rod 24 bears against a stud or pin 28 attached to the valve 18 and extended through a slot 29 in the valve casing 16, and the valve rod 25 bears against a stud or pin 30 attached to the valve 19 and extended through a slot 31 in the valve casing 17.

The valves 18, 19 are moved forward by pressure applied to the rear ends of the valve rods 24, 25, and are moved back into their normal or closed position by springs 32, 33, which have one end attached to the receptacles $a$, $b$, and their other ends free and bearing against the pins or studs 28, 30.

The receptacles $a$, $b$, are detachable from their supporting frame and when assembled on the said frame are locked thereto against accidental disengagement. In the present instance, one form of locking device is shown, which consists of a sheet metal strip or arm 40 fastened at one end to the receptacle and provided at its free end with a bent finger 41, see Fig. 5, which enters a slot 42 in the rear upright member $d$ of the supporting frame. The arm 40 possesses sufficient spring action to permit the finger 41 to be forced backward when said finger is engaged with the upright member $d$, until the finger 41 meets the slot 42 in said upright member, whereupon the spring action of the arm 40 carries the finger 41 into the slot 42 to secure the receptacle to the upright member $d$. The receptacles are engaged with the front upright member $c$ by the nozzle 14 on the receptacle a and by the nozzle 15 on the receptacle b. The locking fingers 41 on the spring arms 40 may be withdrawn from the slots 42 in the upright rear member d by finger pieces 45, which are attached at their front ends to the front ends of the arms 40 and are bent to form fulcrums 46, which bear against the arms 40 and upon which the finger pieces 45 turn when pressure is applied to the rear ends of said pieces, and thereby withdraw the fingers 41 from their slots in the rear upright member d.

The receptacles a, b, may be provided with individual covers to close them, or as herein-shown they may have cooperating with them a cover 50 which is common to both and is hinged at 51 to the rear upright member d.

From the above description, it will be seen that the receptacles a, b, are capable of being readily attached to the supporting frame by inserting the nozzles 14, 15, into the openings 52, 530 in the front upright member c and then moving the rear portions of the receptacles toward the vertical wall e until the locking fingers 41 enter the slots in the rear upright member d.

When it is desired to pour one liquid from one receptacle as a, the operator grasps the handle 53 with one hand, elevates the pot and presses upon the valve rod 24 with the thumb of the hand which grasps the handle, until the valve 18 is moved into its open position with the port 20 registering with the port 22, thereby connecting the receptacle a with the passage 12 in the nozzle, so that coffee or other liquid in the receptacle can flow therefrom out through the passage 12. When it is desired to pour from the other receptacle b, the valve rod 25 is operated to move the valve 19 into its open position so that the contents in the receptacle b can flow through the passage 13 in the nozzle.

The valve rods 24, 25 are arranged close together so that they can both be operated at the same time and obtain a mixture of the liquids in the receptacles if desired. The handle 53 is attached to the upright member d. By making the receptacles detachable from their supporting frame, they can be cleaned and prepared individually. So also the valves 18, 19 may be removed from their casings and readily cleaned.

One embodiment of the invention is herein shown, but it is not desired to limit the invention to the particular construction shown.

We claim—

1. In a combination pot, in combination, a supporting frame provided with a handle and with a nozzle, independent liquid holding receptacles detachably secured to said supporting frame and provided with liquid outlets communicating with said nozzle, valves controlling the flow of liquid from said receptacles into said nozzle, and means for operating said valves.

2. In a combination pot, in combination, a supporting frame provided with a handle and with a nozzle, independent liquid holding receptacles provided with valve casings communicating with said nozzle, valves in said casings controlling the flow of liquid from the receptacles to said nozzle, and valve rods carried by said receptacles for moving the valves and extended to near said handle to be operated by the hand which grasps said handle.

3. In a combination pot, in combination, a supporting frame having front and rear upright members and an intermediate wall connecting said members, a nozzle attached to said front member and a handle attached to said rear member, independent liquid receptacles detachably secured to said supporting frame and provided with outlet nozzles extended through the front upright member and communicating with the nozzle attached to said upright member, valve casings within said receptacles communicating with said outlet nozzles, valves within said casings controlling the flow of liquid out of said receptacles, and valve rods connected with said valves to operate the same.

4. In a combination pot, in combination, a supporting frame provided with a nozzle, independent liquid holding receptacles detachably secured to said supporting frame and having liquid outlets communicating with said nozzle, a valve for each receptacle controlling the flow of liquid therefrom into said nozzle, and means for operating said valves.

In testimony whereof, we have signed our names to this specification.

COSMO PEDUTO.
VINCENZO MARINO.